(12) United States Patent
Tian et al.

(10) Patent No.: US 12,425,648 B2
(45) Date of Patent: Sep. 23, 2025

(54) UPSAMPLING OF DISPLACEMENT FIELD IN MESH COMPRESSION

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 4 days.

(21) Appl. No.: 18/644,027

(22) Filed: Apr. 23, 2024

(65) Prior Publication Data

US 2024/0357165 A1     Oct. 24, 2024

Related U.S. Application Data

(60) Provisional application No. 63/462,935, filed on Apr. 28, 2023, provisional application No. 63/461,549, filed on Apr. 24, 2023.

(51) Int. Cl.
*H04N 19/597* (2014.01)
*H04N 19/132* (2014.01)
(Continued)

(52) U.S. Cl.
CPC ......... *H04N 19/597* (2014.11); *H04N 19/132* (2014.11); *H04N 19/172* (2014.11); *H04N 19/186* (2014.11); *H04N 19/70* (2014.11)

(58) Field of Classification Search
CPC .. H04N 19/597; H04N 19/132; H04N 19/172; H04N 19/186; H04N 19/70; H04N 19/59
See application file for complete search history.

(56) References Cited

U.S. PATENT DOCUMENTS

| 2005/0053294 A1* | 3/2005 | Mukerjee | H04N 19/51 375/E7.125 |
| 2014/0064386 A1* | 3/2014 | Chen | H04N 19/117 375/240.29 |

(Continued)

OTHER PUBLICATIONS

"Information technology—Coded representation of immersive media—Part 29: Video-based dynamic mesh coding (V-DMC)", WD stage, ISO/IEC JTC 1/SC 29/WG 7, ISO 23090-29:2023(E), 2023, 74 pages.

(Continued)

*Primary Examiner* — Fabio S Lima
(74) *Attorney, Agent, or Firm* — ArentFox Schiff LLP

(57) ABSTRACT

Aspects of the disclosure includes methods and apparatuses for mesh processing and a method of processing mesh data. The apparatus for mesh processing includes processing circuitry configured to receive coded information indicating that a displacement field of a chroma component of a current frame is down-sampled according to a sampling format. The down-sampled displacement field of the chroma component includes a first array of displacement vectors. The processing circuitry is configured to reconstruct the first array of displacement vectors of the down-sampled displacement field and up-sample the down-sampled displacement field according to the sampling format to generate an up-sampled displacement field of the chroma component that includes a second array of displacement vectors. The second array of displacement vectors includes the first array of displacement vectors and additional displacement vectors.

20 Claims, 11 Drawing Sheets

(51) Int. Cl.
*H04N 19/172* (2014.01)
*H04N 19/186* (2014.01)
*H04N 19/70* (2014.01)

(56) References Cited

U.S. PATENT DOCUMENTS

| | | | | |
|---|---|---|---|---|
| 2015/0071357 A1* | 3/2015 | Pang | ................... | H04N 19/563 |
| | | | | 375/240.16 |
| 2018/0131962 A1* | 5/2018 | Chen | ................... | H04N 19/176 |
| 2021/0329248 A1* | 10/2021 | Deng | ................... | H04N 19/60 |
| 2021/0400306 A1* | 12/2021 | Xu | ................... | H04N 19/1883 |
| 2022/0191447 A1* | 6/2022 | Zhang | ................... | H04N 19/70 |
| 2023/0403397 A1* | 12/2023 | Li | ................... | H04N 19/117 |

OTHER PUBLICATIONS

Mammou et al., "[V-CG] Apple's Dynamic Mesh Coding CfP Response", Apple Inc., International Organisation for Standardisation Organisation Internationale de normalisation, ISO/IEC JTC 1/SC 29/WG 7, Coding of moving pictures and audio, m59281, Apr. 2022, 24 pages.

* cited by examiner

UPSAMPLING OF DISPLACEMENT FIELD IN MESH COMPRESSION

INCORPORATION BY REFERENCE

The present application claims the benefit of priority to U.S. Provisional Application No. 63/461,549, "Upsampling of Displacement Coding in Mesh Compression" filed on Apr. 24, 2023 and U.S. Provisional Application No. 63/462,935, "Upsampling of Displacement Coding" filed on Apr. 28, 2023, which are incorporated by reference herein in their entirety.

TECHNICAL FIELD

The present disclosure describes aspects generally related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression may help transmit image/video data across different devices, storage and networks with minimal quality degradation. In some examples, video codec technology may compress video based on spatial and temporal redundancy. In an example, a video codec may use techniques referred to as intra prediction that may compress an image based on spatial redundancy. For example, the intra prediction may use reference data from the current picture under reconstruction for sample prediction. In another example, a video codec may use techniques referred to as inter prediction that may compress an image based on temporal redundancy. For example, the inter prediction may predict samples in a current picture from a previously reconstructed picture with motion compensation. The motion compensation may be indicated by a motion vector (MV).

Advances in three-dimensional (3D) capture, modeling, and rendering have promoted 3D content across various platforms and devices. For example, a baby's first step in one continent is captured and grandparents may see (and in some cases interact) and enjoy a full immersive experience with the child in another continent. In order to achieve such realism, models are becoming more sophisticated, and a significant amount of data is linked to the creation and consumption of those models. 3D meshes are widely used to represent such immersive contents.

SUMMARY

Aspects of the disclosure include methods and apparatuses for mesh processing.

According to an aspect of the disclosure, an apparatus for mesh decoding includes processing circuitry. The processing circuitry is configured to receive coded information indicating that a displacement field of a chroma component of a current frame is down-sampled according to a sampling format. The down-sampled displacement field of the chroma component includes a first array of displacement vectors. The processing circuitry is configured to reconstruct the first array of displacement vectors of the down-sampled displacement field and up-sample the down-sampled displacement field according to the sampling format to generate an up-sampled displacement field of the chroma component that includes a second array of displacement vectors. The second array of displacement vectors includes the first array of displacement vectors and additional displacement vectors.

In an example, a zero displacement vector is added as one of the additional displacement vectors between two displacement vectors of the first array of displacement vectors.

In an example, a copy of one of the first array of displacement vectors is added as one of the additional displacement vectors that is a neighbor of the one of the first array of displacement vectors in the second array of displacement vectors. In an example, the one of the additional displacement vectors is a right neighbor of the one of the first array of displacement vectors in the second array of displacement vectors.

In an aspect, one of the additional displacement vectors is added between a plurality of displacement vectors of the first array of displacement vectors. The one of the additional displacement vectors is a linear interpolation of the plurality of displacement vectors of the first array of displacement vectors. In an example, the plurality of displacement vectors includes two displacement vectors in the same row in the first array of displacement vectors. In an example, the plurality of displacement vectors includes four displacement vectors in two adjacent rows and in two adjacent columns in the first array of displacement vectors.

In an example, a respective weight for each of the plurality of displacement vectors is determined based on a distance between each of the plurality of displacement vectors and the one of the additional displacement vectors in the second array of displacement vectors. The linear interpolation of the plurality of displacement vectors is determined using a weighted average of the plurality of displacement vectors that is based on the weights.

In an aspect, one of the additional displacement vectors is added between a plurality of displacement vectors of the first array of displacement vectors. The one of the additional displacement vectors is a nonlinear interpolation of the plurality of displacement vectors of the first array of displacement vectors.

In an example, the sampling format is 4:2:0, a horizontal sampling rate is 2, and a vertical sampling rate is 2. When the first array of displacement vectors of the down-sampled displacement field has a size of M1×N1, the second array of displacement vectors of the up-sampled displacement field has a size of 2M1×2N1, and a displacement field of a luma component has a size of 2M1×2N1.

In an aspect, a method of mesh encoding includes generating a down-sampled displacement field of a chroma component of a current frame according to a sampling format. The down-sampled displacement field of the chroma component includes a first array of displacement vectors. The method includes encoding, in a bitstream, the down-sampled displacement field of the chroma component and encoding a syntax element in the bitstream indicating that the down-sampled displacement field of the chroma component is to be up-sampled at a decoder side.

In an aspect, a method of processing mesh data includes processing a bitstream of the mesh data according to a format rule. The bitstream includes a syntax element indicating that an encoded displacement field of a chroma component of a current frame is down-sampled according to a sampling format. The down-sampled displacement field of the chroma component includes a first array of displacement vectors. The format rule specifies that the first array of displacement vectors of the down-sampled displacement field is reconstructed. The format rule specifies that the down-sampled displacement field is up-sampled according to the sampling format to generate an up-sampled displacement field of the chroma component that includes a second array of displacement vectors. The second array of displacement vectors including the first array of displacement vectors and additional displacement vectors.

In an aspect, the format rule specifies that a zero displacement vector is added as one of the additional displacement vectors between two displacement vectors of the first array of displacement vectors.

In an aspect, the format rule specifies that a copy of one of the first array of displacement vectors is added as one of the additional displacement vectors that is a neighbor of the one of the first array of displacement vectors in the second array of displacement vectors.

In an aspect, the one of the additional displacement vectors is a right neighbor of the one of the first array of displacement vectors in the second array of displacement vectors.

In an aspect, the format rule specifies that one of the additional displacement vectors is added between a plurality of displacement vectors of the first array of displacement vectors, the one of the additional displacement vectors being a linear interpolation of the plurality of displacement vectors of the first array of displacement vectors.

In an example, the plurality of displacement vectors includes two displacement vectors in the same row in the first array of displacement vectors.

In an example, the plurality of displacement vectors includes four displacement vectors in two adjacent rows and in two adjacent columns in the first array of displacement vectors.

In an aspect, the format rule specifies that a respective weight for each of the plurality of displacement vectors is determined based on a distance between each of the plurality of displacement vectors and the one of the additional displacement vectors in the second array of displacement vectors. The format rule specifies that the linear interpolation of the plurality of displacement vectors is determined using a weighted average of the plurality of displacement vectors that is based on the weights.

In an example, the format rule specifies that one of the additional displacement vectors is added between a plurality of displacement vectors of the first array of displacement vectors. The one of the additional displacement vectors is a nonlinear interpolation of the plurality of displacement vectors of the first array of displacement vectors.

Aspects of the disclosure also provide an apparatus for mesh encoding. The apparatus for mesh encoding including processing circuitry configured to implement any of the described methods of mesh processing performed in an encoder.

Aspects of the disclosure also provide a method for mesh processing. The method including any of the methods implemented by the apparatus (e.g., a decoder) for mesh processing.

Aspects of the disclosure also provide a non-transitory computer-readable medium storing instructions which, when executed by a computer, cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
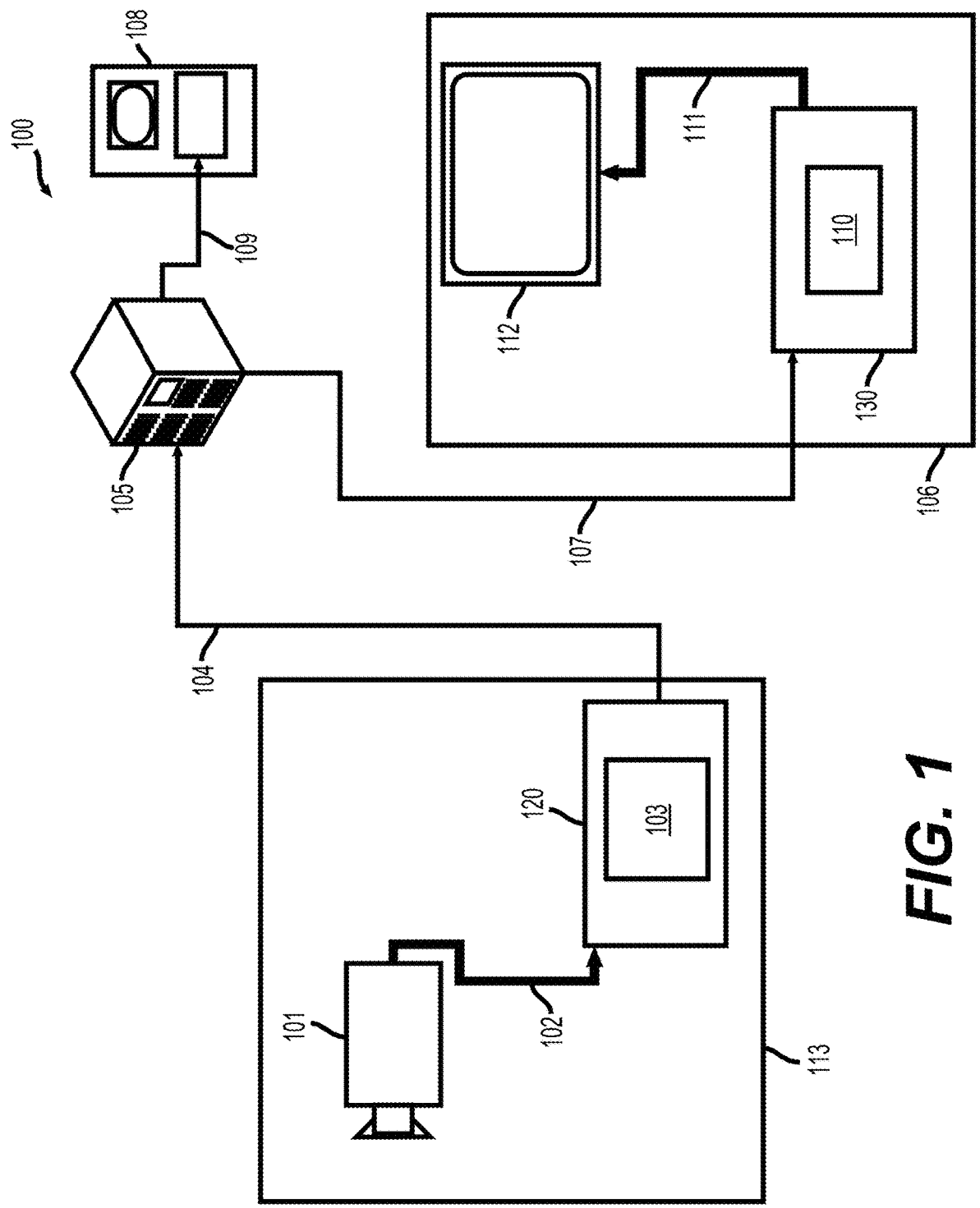
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter may be equally applicable to other image and/or video enabled applications, including, for example, video conferencing, digital TV, streaming services, storing of compressed video on digital media including CD, DVD, memory stick, and the like.

The video processing system (100) includes a capture subsystem (113), that may include a video source (101). The video source (101) may include one or more images captured by a camera and/or generated by a computer. For example, a digital camera may create a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), may be processed by an electronic device (120) that includes a video encoder (103) coupled to the video source (101). The video encoder (103) may include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), may be stored on a streaming server (105) for future use. One or more streaming client subsystems, such as client subsystems (106) and (108) in FIG. 1 may access the streaming server (105) to retrieve copies (107) and (109) of the encoded video data (104). A client subsystem (106) may include a video decoder (110), for example, in an electronic device (130). The video decoder (110) decodes the incoming copy (107) of the encoded video data and creates an outgoing stream of video pictures (111) that may be rendered on a display (112) (e.g., display screen) or other rendering device (not depicted). In some streaming systems, the encoded video data (104), (107), and (109) (e.g., video bitstreams) may be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) may include other components (not shown). For example, the electronic device (120) may include a video decoder (not shown) and the electronic device (130) may include a video encoder (not shown) as well.

Figure 2:
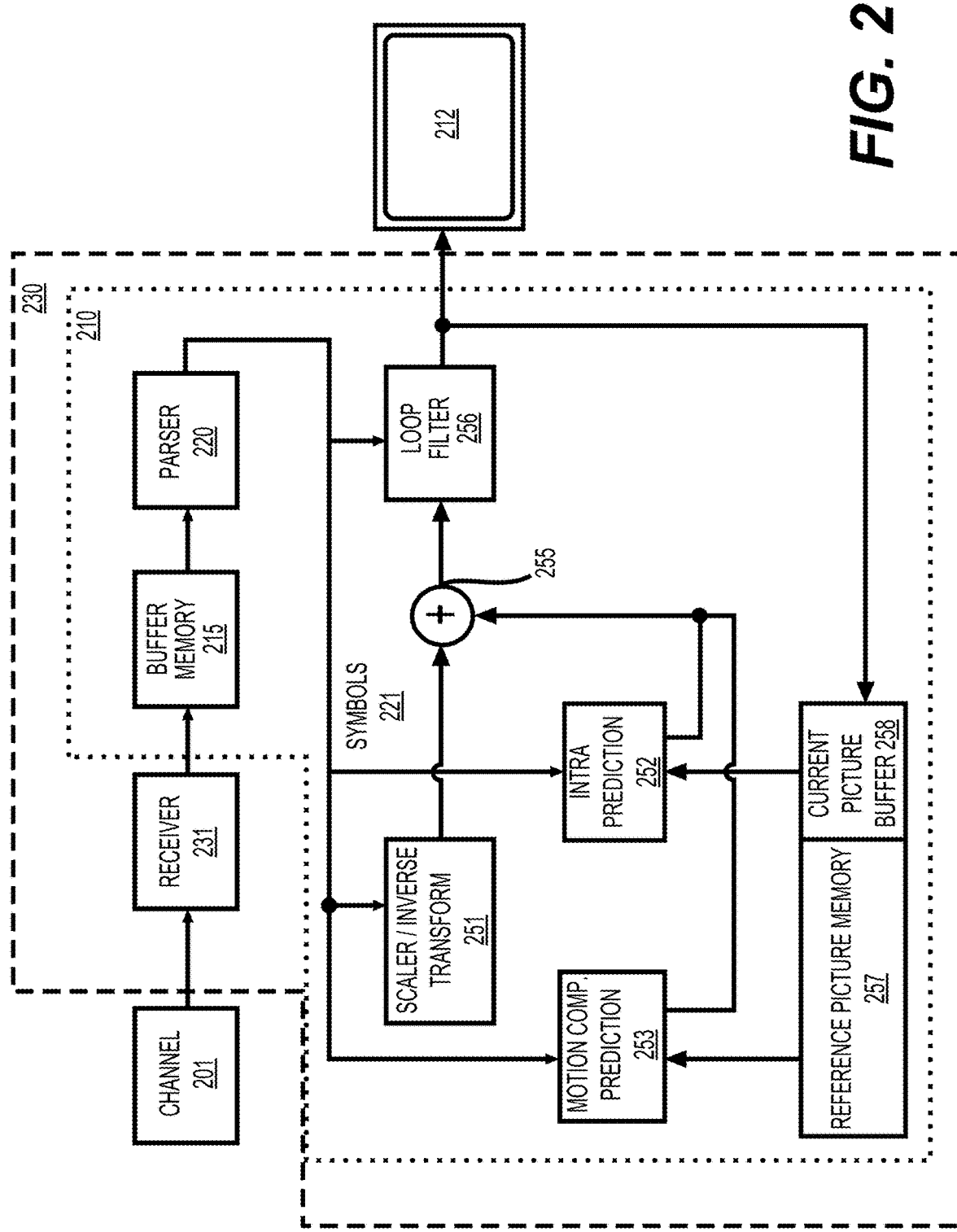
FIG. 2 is a schematic illustration of an example of a block diagram of a decoder.

FIG. 2 shows an example of a block diagram of a video decoder (210). The video decoder (210) may be included in an electronic device (230). The electronic device (230) may include a receiver (231). The receiver (231) may include receiving circuitry, such as network interface circuitry. The video decoder (210) may be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it may be outside of the video decoder (210) (not depicted). In still others, there may be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or may be small. For use on best effort packet networks such as the Internet, the buffer memory (215) may be required, may be comparatively large and may be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but may be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence may be in accordance with a video coding technology or standard, and may follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups may include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) may involve multiple different units depending on the type of the coded video picture or parts thereof (such as: inter and intra picture, inter and intra block), and other factors. Which units are involved, and how, may be controlled by subgroup control information parsed from the coded video sequence by the parser (220). The flow of such subgroup control information between the parser (220) and the multiple units below is not depicted for clarity.

Beyond the functional blocks already mentioned, the video decoder (210) may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) may output blocks comprising sample values, that may be input into aggregator (255).

In some cases, the output samples of the scaler/inverse transform unit (251) may pertain to an intra coded block. The intra coded block is a block that is not using predictive information from previously reconstructed pictures, but may use predictive information from previously reconstructed parts of the current picture. Such predictive information may be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) may pertain to an inter coded, and potentially motion compensated, block. In such a case, a motion compensation prediction unit (253) may access reference picture memory (257) to fetch samples used for prediction. After motion compensating the fetched samples in accordance with the symbols (221) pertaining to the block, these samples may be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples may be controlled by motion vectors, available to the motion compensation prediction unit (253) in the form of symbols (221) that may have, for example X, Y, and reference picture components. Motion compensation also may include interpolation of sample values as fetched from the reference picture memory (257) when sub-sample exact motion vectors are in use, motion vector prediction mechanisms, and so forth.

The output samples of the aggregator (255) may be subject to various loop filtering techniques in the loop filter unit (256). Video compression technologies may include in-loop filter technologies that are controlled by parameters included in the coded video sequence (also referred to as coded video bitstream) and made available to the loop filter unit (256) as symbols (221) from the parser (220). Video compression may also be responsive to meta-information obtained during the decoding of previous (in decoding order) parts of the coded picture or coded video sequence, as well as responsive to previously reconstructed and loop-filtered sample values.

The output of the loop filter unit (256) may be a sample stream that may be output to the render device (212) as well as stored in the reference picture memory (257) for use in future inter-picture prediction.

Certain coded pictures, once fully reconstructed, may be used as reference pictures for future prediction. For example, once a coded picture corresponding to a current picture is fully reconstructed and the coded picture has been identified as a reference picture (by, for example, the parser (220)), the current picture buffer (258) may become a part of the reference picture memory (257), and a fresh current picture buffer may be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile may select certain tools as the only tools available for use under that profile from all the tools available in the video compression technology or standard. Also necessary for compliance may be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels may, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or signal noise ratio (SNR) enhancement layers, redundant slices, redundant pictures, forward error correction codes, and so on.

Figure 3:
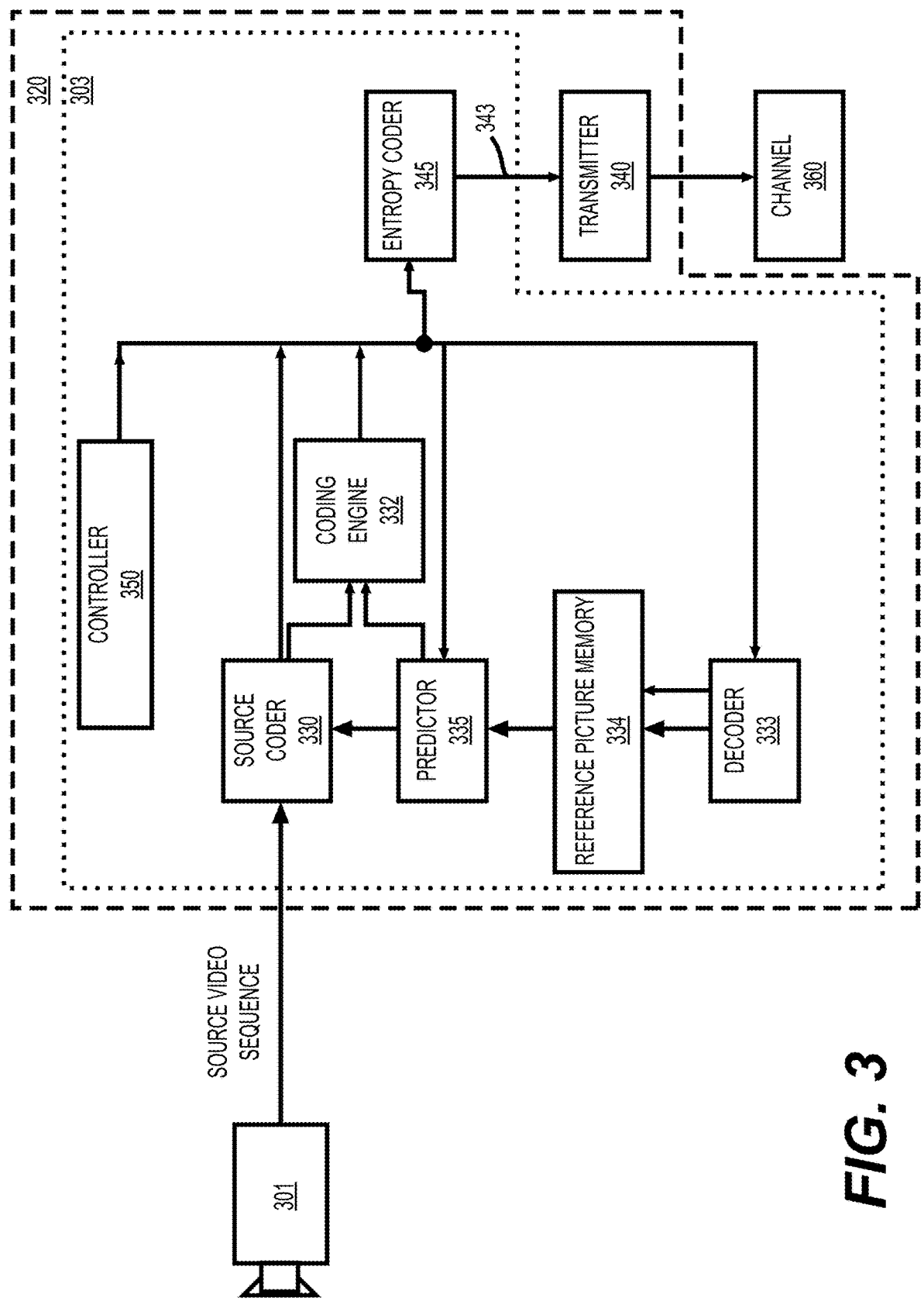
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) may be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that may be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel may include one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) may include rate control related parameters (picture skip, quantizer, lambda value of rate-distortion optimization techniques, . . . ), picture size, group of pictures (GOP) layout, maximum motion vector search range, and so forth. The controller (350) may be configured to have other suitable functions that pertain to the video encoder (303) optimized for a certain system design.

In some aspects, the video encoder (303) is configured to operate in a coding loop. As an oversimplified description, in an example, the coding loop may include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity may not be maintained, for example because of channel errors) is used in some related arts as well.

The operation of the "local" decoder (333) may be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) may be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies may be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using at most one motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures may use more than two reference pictures and associated metadata for the reconstruction of a single block.

Aspect of the present disclosure may also be applied to variants of I pictures, P pictures, and B pictures, and their respective applications and features.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may include temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes use of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture may be coded by a vector that is referred to as a motion vector. The motion vector points to the reference block in the reference picture, and may have a third dimension identifying the reference picture, in case multiple reference pictures are in use.

In some aspects, a bi-prediction technique may be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture may be coded by a first motion vector that points to a first reference block in the first reference picture, and a second motion vector that points to a second reference block in the second reference picture. The block may be predicted by a combination of the first reference block and the second reference block.

Further, a merge mode technique may be used in the inter-picture prediction to improve coding efficiency.

According to some aspects of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUS in a picture have the same size, such as 64×64 pixels, 32×32 pixels, or 16×16 pixels. In general, a CTU includes three coding tree blocks (CTBs), which are one luma CTB and two chroma CTBs. Each CTU may be recursively quadtree split into one or multiple coding units (CUs). For example, a CTU of 64×64 pixels may be split into one CU of 64×64 pixels, 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) may be implemented using any suitable technique. In an aspect, the video encoders (103) and (303) and the video decoders (110) and (210) may be implemented using one or more integrated circuits. In another aspect, the video encoders (103) and (303), and the video decoders (110) and (210) may be implemented using one or more processors that execute software instructions.

The disclosure includes aspects related to methods and systems of upsampling of displacement coding in mesh compression.

A mesh may include several polygons that describe a surface of a volumetric object. Each polygon of the mesh may be defined by vertices of the corresponding polygon in a three-dimensional (3D) space and information of how the vertices are connected, which may be referred to as connectivity information. In some aspects, vertex attributes, such as colors, normals, and the like, may be associated with the vertices (or the mesh vertices). Attributes (or vertex attributes) may also be associated with the surface of the mesh by exploiting mapping information that parameterizes the mesh with two-dimensional (2D) attribute maps. Such mapping may be described by a set of parametric coordinates, referred to as UV coordinates or texture coordinates, associated with the mesh vertices. 2D attribute maps may be used to store high resolution attribute information such as texture, normals, displacements, and the like. The high resolution attribute information may be used for various purposes such as texture mapping and shading.

A dynamic mesh sequence may require a large amount of data since the dynamic mesh may include a significant amount of information changing over time. Therefore, efficient compression technologies may be used to store and transmit such contents. Mesh compression standards, such as information and communication (IC) mesh compression, MESHGRID, and frame-based animated mesh compression (FAMC), were previously developed by Moving Picture Experts Group (MPEG) to address dynamic meshes with a constant connectivity, a time varying geometry, and vertex attributes. However, the standards may not consider time varying attribute maps and connectivity information. DCC (Digital Content Creation) tools may generate such dynamic meshes. However, it may be challenging for volumetric acquisition techniques to generate a constant connectivity dynamic mesh, especially under real time constraints. This type of content (e.g., a constant connectivity dynamic mesh) may not be supported by existing standards. A new mesh compression standard may be developed to directly handle dynamic meshes with time varying connectivity information and optionally time varying attribute maps. The new mesh compression standard may target lossy and lossless compression for various applications, such as real-time communications, a storage, a free viewpoint video, Augmented Reality (AR), and Virtual Reality (VR). Functionalities, such as a random access and a scalable/progressive coding, may also be considered.

Figure 4A:
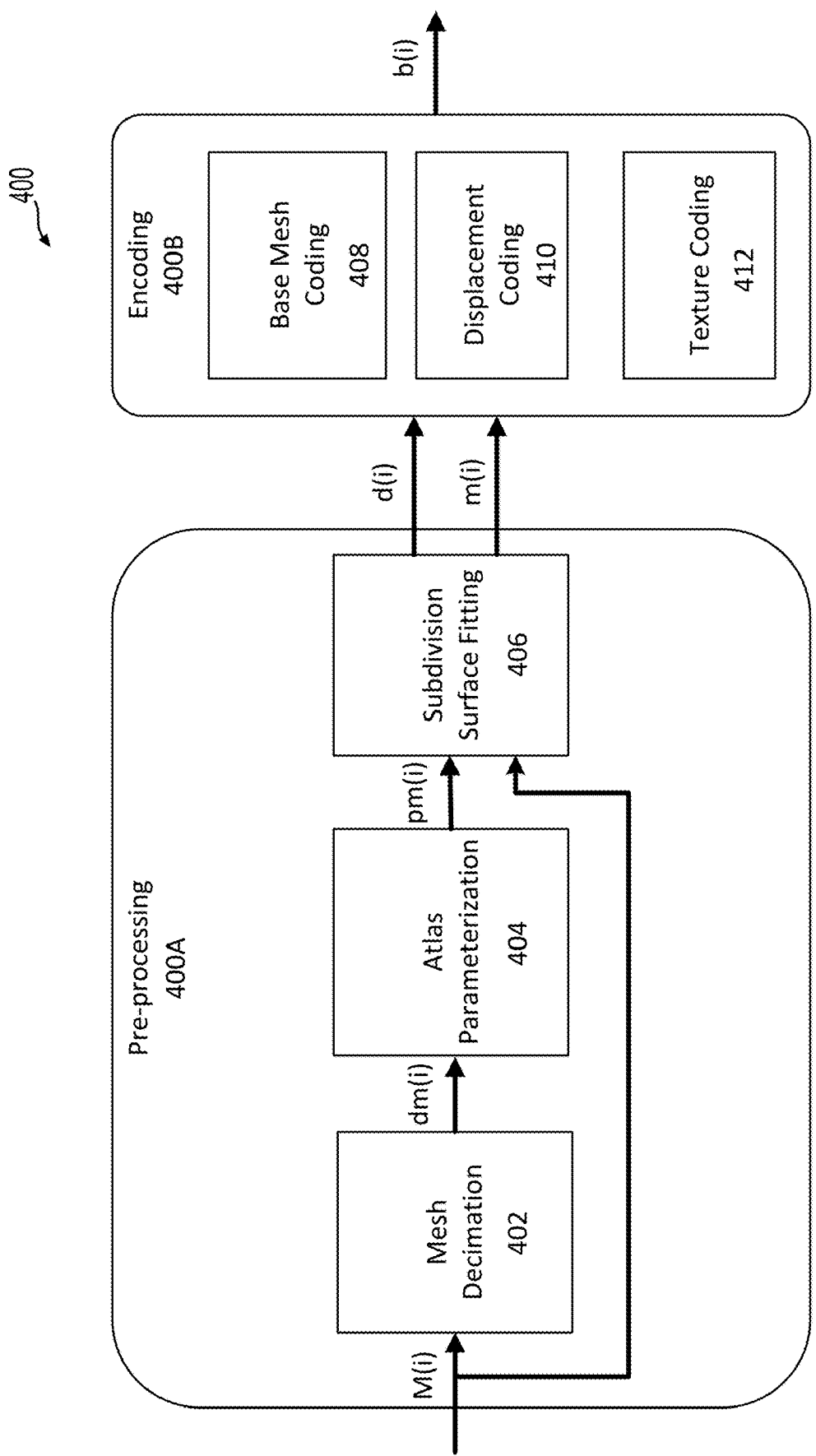
FIG. 4A shows an example of an encoding process for mesh processing based on a related video codec according to an aspect of the disclosure.

FIG. 4A shows an example of an encoding process (400) for mesh processing based on a related video codec, such as MPEG V-Mesh TM v1.0, according to an aspect of the disclosure. As shown in FIG. 4A, the encoding process (400) may include a pre-processing step (400A) and an encoding step (400B). The pre-processing step (400A) may be configured to generate a base mesh m(i) of a current frame and a displacement field d(i) of the current frame that includes displacement vectors according to an input mesh M(i) of the current frame. The encoding step (400B) may be configured to encode the base mesh m(i), the displacement field d(i), and texture information of the base mesh m(i). The displacement field d(i) of the current frame may include displacement vectors. An index i may refer to the current frame. In an aspect, a mode decision method may be performed in the encoding process (400) to determine whether inter coding (also referred to as inter frame prediction or an inter mode), intra coding (also referred to as intra frame prediction or an intra mode), or the like is applied to the current frame. For example, the mode decision method may compare a cost of an intra mode and a cost of an inter mode and decide a coding mode of the base mesh m(i) of the current frame based on which one of the costs is smaller. In some examples, a skip mode is used to code (e.g., encode or decode) the base mesh m(i). In an example, the skip mode is a special mode of the inter mode. For example, the base mesh m(i) may be intra coded, or inter coded, or coded with the SKIP mode.

Still referring to FIG. 4A, the pre-processing step (400A) may include a mesh decimation process (402), a parameterization process such as an atlas parameterization process (404), and a subdivision surface fitting process (406). The mesh decimation process (402) is configured to down-sample vertices of the input mesh M(i) to generate a decimated mesh dm(i) that may include a plurality of decimated (or down-sampled) vertices. A number of the plurality of decimated vertices is less than a number of the vertices of the input mesh M(i). The parameterization process such as the atlas parameterization process (404) is configured to map the decimated mesh dm(i) onto a planar domain, such as onto a UV atlas (or a UV map), to generate a re-parameterized mesh pm(i). In an example, the atlas parameterization may be performed based on a video processing tool, such as a UVAtlas tool. The subdivision surface fitting process (406) is configured to take the re-parameterized mesh pm(i) and the input mesh M(i) as inputs and produce a based mesh m(i) together with the displacement field d(i) that includes the displacement vectors or a set of displacements. In an example of the subdivision surface fitting process (406), pm(i) is subdivided by using a subdivision scheme such as an iterative interpolation to obtain a subdivided mesh. The iterative interpolation includes inserting at each iteration a new point in a middle of each edge of the re-parameterized mesh pm(i). Any suitable subdivision scheme may be applied to subdivide pm(i). The displacement field d(i) is computed by determining a nearest point on a surface of the input mesh M(i) for each vertex of the subdivided mesh.

An advantage of the subdivided mesh may include that the subdivided mesh has a subdivision structure that allows efficient compression, while offering a faithful approximation of the input mesh. The compression efficiency may be obtained due to the following properties. The decimated mesh dm(i) may have a low number of vertices and may be encoded and transmitted using a lower number of bits than the input mesh M(i) or the subdivided mesh. Referring to FIG. 4A, the base mesh m(i) may be generated from the decimated mesh dm(i). In an example, the base mesh m(i) is the decimated mesh dm(i). As the subdivided mesh may be generated based on the subdivision method, the subdivided mesh may be automatically generated by the decoder when the base mesh or the decimated mesh is decoded (e.g., there is no need to use any information other than the subdivision scheme and a subdivision iteration count). At the decoder side, the displacement field d(i) may be generated by decoding the displacement vectors associated with the vertices of the subdivided mesh. Besides allowing for spatial/quality scalability, the subdivision structure enables efficient transforms such as wavelet decomposition, which can offer high compression performance.

Figure 5:
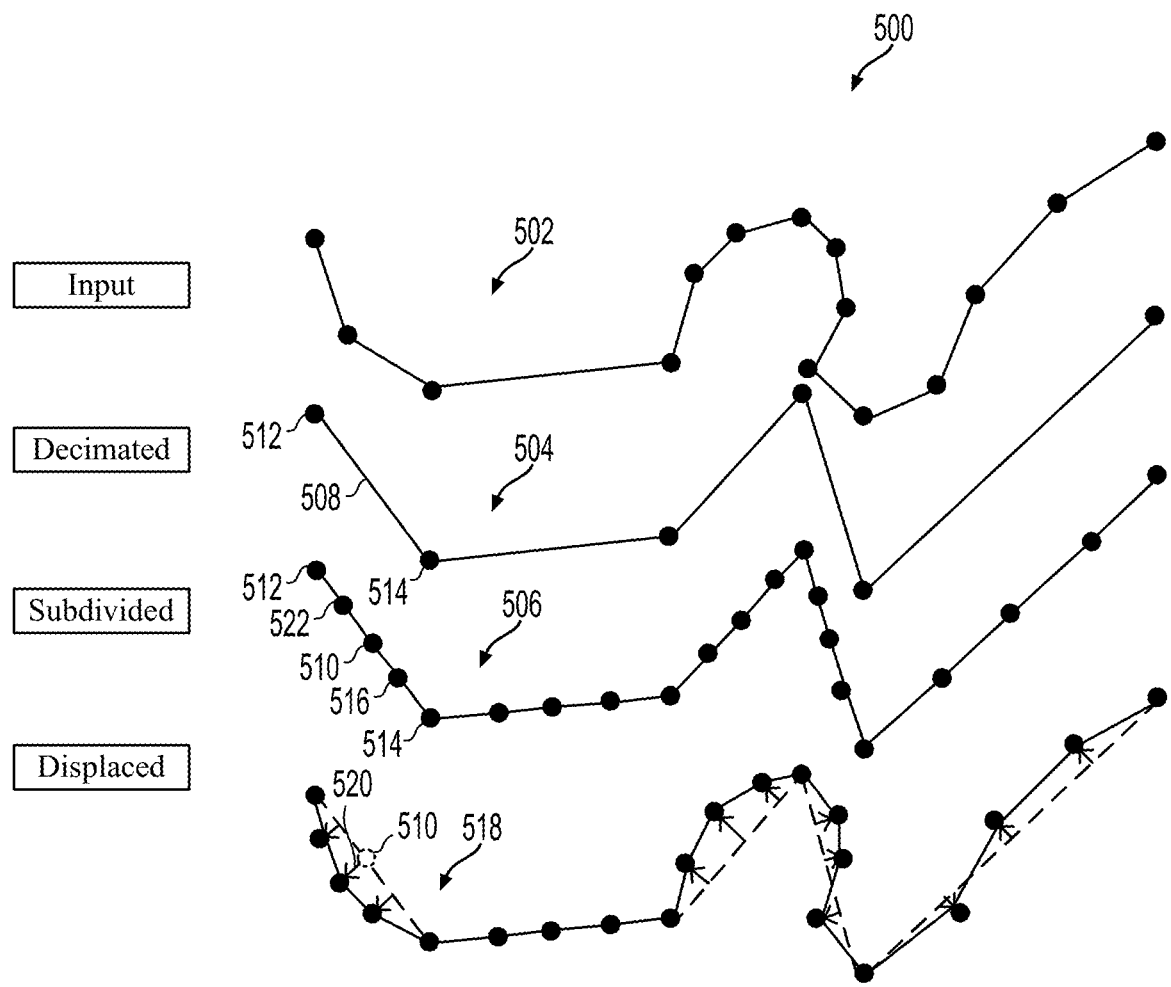
FIG. 5 shows an example of the pre-processing step according to an aspect of the disclosure.

For the purposes of brevity, the pre-processing step (400A) that may be applied to an input mesh such as a 3D mesh may be illustrated using a pre-processing step (500) that is applied to a two-dimensional (2D) curve. The pre-processing step (400A) and the pre-processing step (500) are similar except that a 3D mesh may be replaced by a 2D curve. FIG. 5 shows an example of the pre-processing step (500) according to an aspect of the disclosure. As shown in FIG. 5, an input 2D curve (represented by a 2D polyline) (502) may be down-sampled to generate a base curve such as a polyline, referred to as "decimated" curve (504). A subdivision scheme may then be applied to the decimated polyline (504) to generate a "subdivided" curve (506). In an example, the subdivision scheme may be an iterative interpolation scheme. The iterative interpolation scheme may include inserting at each iteration a new point in a middle of each edge of the polyline (or decimated curve) (504). For example, a point (510) may be inserted in the edge (508) of the decimated curve (504). In an example, the edge (508) is between points (512) and (514). Further, a point (522) may be added between the point (512) and the point (510), and a point (516) may be added between the point (510) and the point (514). The subdivided polyline (506) is then deformed to generate a displaced curve (518). The displaced curve (518) may be a better approximation of the input curve (502) than the subdivided curve (506). For example, a displacement vector (e.g., (520)) is computed for each vertex (e.g., (510)) of the subdivided curve (506) such that a shape of the displaced curve (518) is as close as possible to a shape of the input curve (502). An advantage of the subdivided curve (506) is that the subdivided curve (506) has a subdivision structure that allows for more efficient compression, while offering a faithful approximation of the input curve (502).

The decimated curve (504) may have a low number of points and may be encoded and transmitted using a limited number of bits. As the subdivide curve may be generated based on the subdivision scheme, the subdivide curve may be automatically generated by the decoder when the base curve or the decimated curve is decoded (e.g., there is no need to use any information other than the subdivision method and a subdivision iteration count). The displaced curve is generated by decoding the displacement vectors associated with the subdivided curve vertices. Besides allowing for spatial/quality scalability, the subdivision structure enables efficient transforms such as wavelet decomposition, which can offer high compression performance.

Still referring to FIG. 5, in an example, an input mesh M(i) may include the input 2D curve (502). A base mesh m(i) may include the decimated curve (504) that is formed via down-sampled vertices of the input 2D curve (502). A displacement field dm(i) may include a plurality of displacement vectors, such as the displacement vector (520), shown in FIG. 5.

The encoding step (400B) may include a base mesh coding (408), a displacement coding (410), a texture coding (412), and the like. The base mesh coding (408) is configured to encode geometric information of the base mesh m(i) associated with the current frame. In an intra encoding, the base mesh m(i) may be first quantized (e.g., using uniform quantization) and then encoded, for example, by the coding mode determined using the mode decision method. The coding mode may be the inter mode, the intra mode, the skip mode, or the like. The encoder used to intra code the base mesh m(i) may be referred to as a static mesh encoder. In the inter encoding, a reference base mesh (e.g., a reconstructed quantized reference base mesh m'(j)) associated with a reference frame indicated by an index j may be used to predict the base mesh m(i) associated with the current frame indicated by the index i. The displacement coding (410) is configured to encode the displacement field d(i) that is generated in the pre-processing step (400A). The displacement field d(i) may include a set of displacement vectors (or displacements) associated with the subdivided mesh vertices. The texture coding (412) is configured to encode attribute information of the base mesh m(i). The attribute information may include texture, normal, color, and/or the like. The attribute information may be encoded based on a suitable codec, such as High-Efficiency Video Coding (HEVC) or Versatile Video Coding (VVC).

In an aspect, referring to FIG. 4A, a mesh encoding process such as the encoding process (400) starts with a pre-processing (e.g., the pre-processing step (400A)). The pre-processing may convert the input mesh (e.g., the input dynamic mesh) M(i) into the base mesh m(i) together with the displacement field d(i) including a set of displacements (or a set of displacement vectors). The encoding step (400B) may compress outputs (e.g., m(i), d(i), and the like) from the pre-processing and generate a compressed bitstream b(i). The compressed bitstream b(i) may include a compressed base mesh bitstream, a compressed displacement field bitstream (also referred to as a compressed displacement bitstream), a compressed attribute bitstream, and/or the like.

Figure 4B:
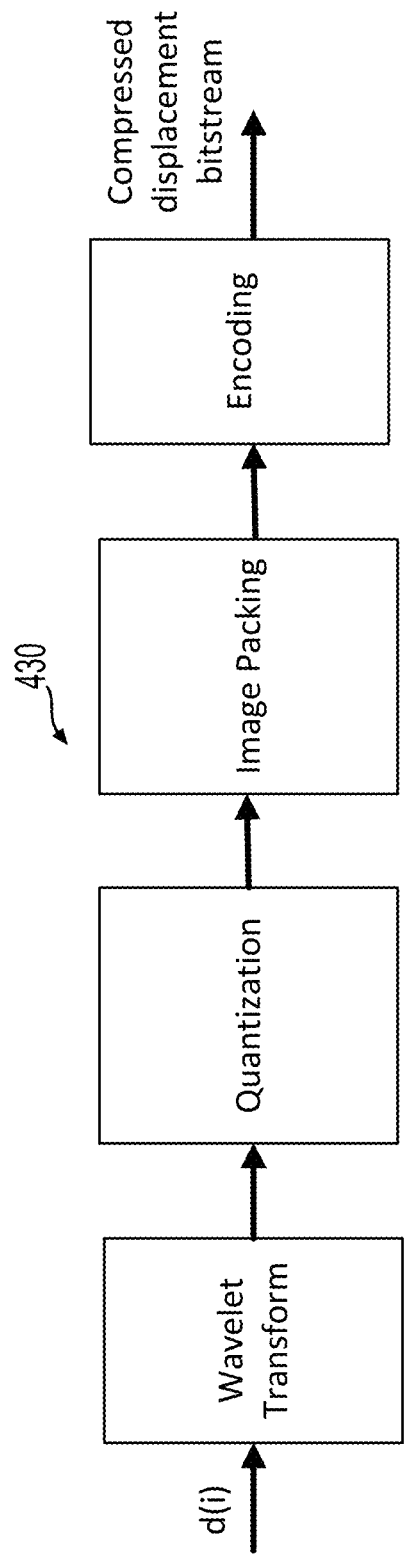
FIG. 4B shows an example of a displacement encoding process according to an aspect of the disclosure.

FIG. 4B shows an example of a displacement encoding process (430) according to an aspect of the disclosure. In an example, the displacement coding (410) is implemented using the displacement encoding process (430). The displacement encoding process (430) may encode the displacement field d(i) that includes a set of displacement vectors associated with the subdivided mesh vertices. In an example, the reconstructed quantized base mesh is used to update the displacement field d(i) to generate an updated displacement field d'(i). Referring to FIG. 4B, a wavelet transform may be applied to the displacement field d'(i) and a set of wavelet coefficients may be generated. Any suitable waveform transform may be applied including the identity transform. The wavelet coefficients may be quantized, packed into a 2D image and/or video, and may be encoded using any suitable image and/or video encoding method (e.g., arithmetic coding, a traditional image and/or video encoder, or some other encoder) to generate the compressed displacement bitstream.

Figure 4C:
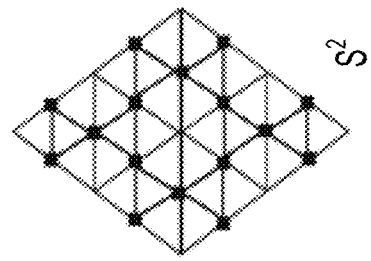
FIG. 4C shows an example of a mid-point subdivision scheme according to an aspect of the disclosure.
Figure 4C:
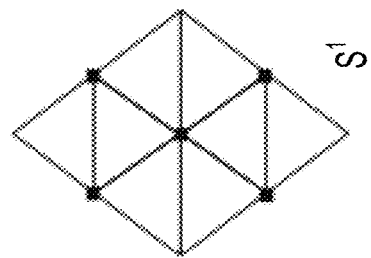
Figure 4C:
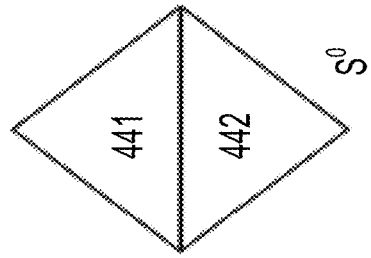

FIG. 4C shows an example of a mid-point subdivision scheme (440) according to an aspect of the disclosure. Various subdivision schemes including the mid-point subdivision scheme (440) may be applied, for example, in the pre-processing step (400A). According to the mid-point subdivision scheme (440), at each subdivision iteration (e.g., $S^0$, $S^1$, and $S^2$) each triangle may be subdivided into 4 sub-triangles. New vertices may be introduced in the middle of each edge. For example, at the iteration $S^0$, a triangle (441) is divided into 4 sub-triangles, and a triangle (442) is divided into 4 sub-triangles. At the iteration $S^1$, each of the sub-triangles is further divided to form a mesh shown at the iteration $S^2$.

Figure 6A:
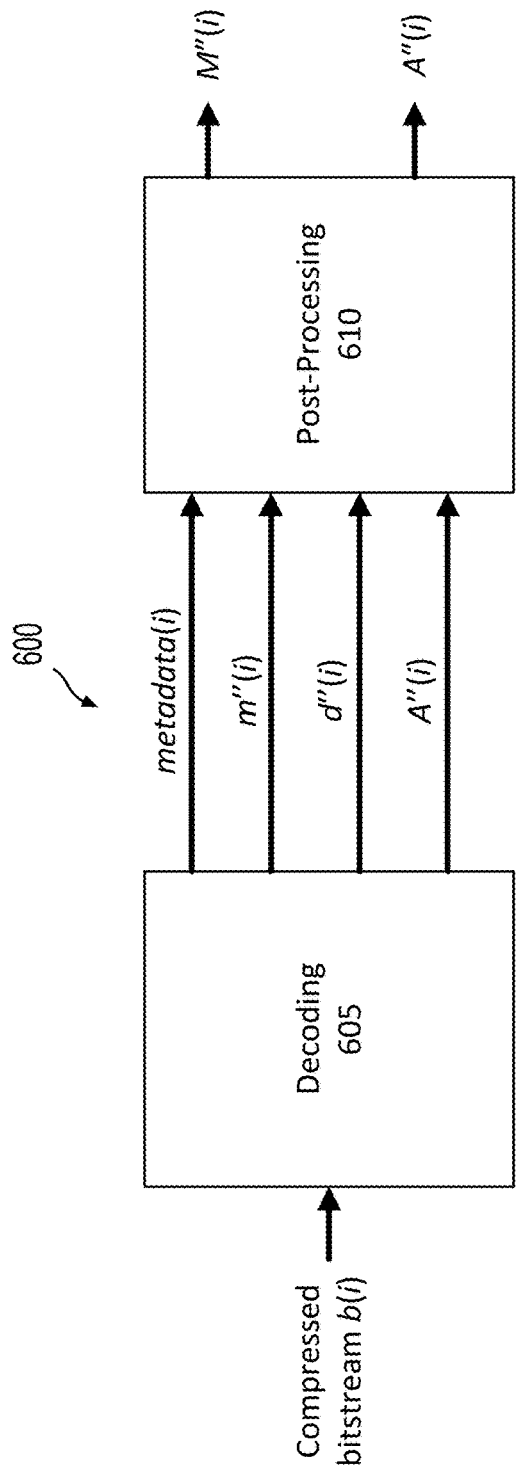
FIG. 6A shows an example of a decoding process for mesh processing according to an aspect of the disclosure.

FIG. 6A shows an example of a decoding process (600) for mesh processing according to an aspect of the disclosure. The decoding process (600) may include a decoding step (605) and a post-processing step (610). A compressed bitstream b(i) may be fed to the decoding step (605). In an example, for a lossless transmission, the compressed bitstream b(i) is the output b(i) from the encoding process (400). The decoding step (605) may extract various sub-bitstreams such as the compressed base mesh sub-stream, the compressed displacement field sub-stream, the compressed attribute sub-stream, and/or the like. The decoding step (605) may decompress the sub-bitstreams to generate the following components: patch metadata indicated by metadata(i), a decoded base mesh m"(i), a decoded displacement field (including displacements) d"(i), a decoded attribute map A"(i), and/or the like.

In an aspect, the base mesh sub-stream may be fed to a mesh decoder to generate a reconstructed quantized base mesh m'(i). The decoded base mesh m"(i) may be obtained by applying an inverse quantization to m'(i). The displacement field sub-stream including packed and quantized wavelet coefficients that are encoded may be decoded by a video and/or image decoder. Image unpacking and inverse quantization may be applied to the packed quantized wavelet coefficients that are reconstructed to obtain the unpacked and dequantized transformed coefficients (e.g., wavelet coefficients). An inverse wavelet transform may be applied to the unpacked and dequantized wavelet coefficients to generate the decoded displacement field d"(i).

The decoded components (e.g., including metadata(i), m"(i), d"(i), A"(i), and/or the like) may be fed to a post-processing step (610). A mesh (also referred to as a decoded mesh) M"(i) may be generated by the post-processing step (610) based on m"(i) and d"(i). In an example, the reconstructed deformed mesh DM(i) may be obtained by subdividing m"(i) using a subdivision scheme and applying the reconstructed displacements d"(i) to vertices of a subdivided mesh. In an example, when the encoding process (400), the decoding process (600), and the transmission are lossless, the mesh M"(i) may be identical to the input mesh M(i). When one of the encoding process (400), the decoding process (600), and the transmission is lossy, M"(i) is different from M(i). In various examples, the difference, if any, between M"(i) and M(i) is relatively small. In an example, an attribute map A"(i) is also generated by the post-processing step (610).

Figure 6B:
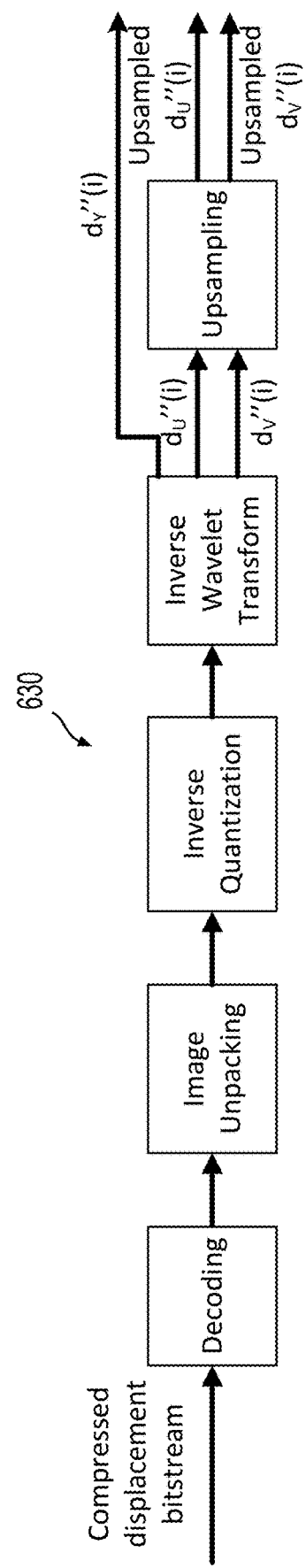
FIG. 6B shows an example of a displacement decoding process according to an aspect of the disclosure.

FIG. 6B shows an example of a displacement decoding process (630) according to an aspect of the disclosure. In an example, the decoding step (605) includes the displacement decoding process (630). Referring to FIG. 6B, a compressed displacement bitstream or a displacement sub-stream may be decoded by any suitable video and/or image decoder. The decoded wavelet coefficients may be un-packed and an inverse quantization may be applied to the wavelet coefficients. An inverse wavelet transform may be applied to the dequantized wavelet coefficients to obtain the decoded displacement field d"(i).

In an aspect, the displacement field may include multiple components such as a luma component (e.g., the Y components) and chroma component(s) (e.g., the U and V components). In an aspect, the sizes of the multiple components are identical and may be determined based on a size of a subdivided mesh. Each of the multiple components may be represented by an array. A position (i, j) in each array may correspond to the same vertex, such as the vertex in the subdivided mesh.

In an aspect, at the encoder side, the chroma component(s) may be down-sampled, for example, to reduce a number of bits to be transmitted from the encoder to the decoder, and thus increase coding efficiency. According to an aspect of the disclosure, the down-sampled chroma component(s) may be up-sampled at the decoder side to generate a more accurate prediction of the chroma component(s). Each chroma component can have two resolutions, such as a first resolution (e.g., a full resolution) prior to being down-sampled or after being up-sampled, and a second resolution (e.g., a lower resolution that is less than the first resolution) when the chroma component is down-sampled. In an example, the luma component is not down-sampled, and has the first resolution.

In an aspect, at the encoder side, d(i) includes a luma component $d_Y(i)$ of the displacement field d(i), a chroma component $d_U(i)$ of the displacement field d(i), and a chroma component $d_V(i)$ of the displacement field d(i). $d_Y(i)$, $d_U(i)$, and $d_V(i)$ may be represented by a luma array and two chroma arrays, respectively. Referring back to FIG. 4B, in an aspect, at the encoder side, $d_U(i)$ and $d_V(i)$ may be down-sampled according to a sampling format (also referred to as a chroma sampling format), such as 4:2:0, 4:2:2, or the like. In the 4:2:0 sampling, each of the two chroma arrays (e.g., $d_U(i)$ and $d_V(i)$) can have half the height and half the width of the luma array (e.g., $d_Y(i)$). In an example, $d_Y(i)$ has the first resolution (e.g., 2M1×2N1). $d_U(i)$, and $d_V(i)$ are down-sampled and have the second resolution (e.g., M1×N1).

In an aspect, the decoded displacement field d"(i) may include multiple components such as a luma component and chroma component(s). Referring to FIG. 6B, in an example, d"(i) includes a luma component $d"_Y(i)$ of the displacement field d"(i), a chroma component $d"_U(i)$ of the displacement field d"(i), and a chroma component $d"_V(i)$ of the displacement field d"(i). $d"_Y(i)$ may also be referred to as a displacement field of the luma component Y. $d"_U(i)$ may also be referred to as a displacement field of the chroma component U. $d"_V(i)$ may also be referred to as a displacement field of the chroma component V.

$d"_Y(i)$ corresponds to $d_Y(i)$, $d"_U(i)$ corresponds to $d_U(i)$, and $d"_V(i)$ corresponds to $d_V(i)$. When $d_U(i)$ and $d_V(i)$ are down-sampled at the encoder side, at the decoder side, $d"_U(i)$ and $d"_V(i)$ are down-sampled, for example, according to the same sampling format used to down-sample $d_U(i)$ and $d_V(i)$. Referring to FIG. 6B, after $d"_Y(i)$, $d"_U(i)$, and $d"_V(i)$ are determined, an upsampling may be performed, for example, on the down-sampled chroma components $d"_U(i)$ and $d"_V(i)$ to determine an upsampled $d'_U(i)$ and an upsampled $d"_V(i)$, respectively.

Figure 7:
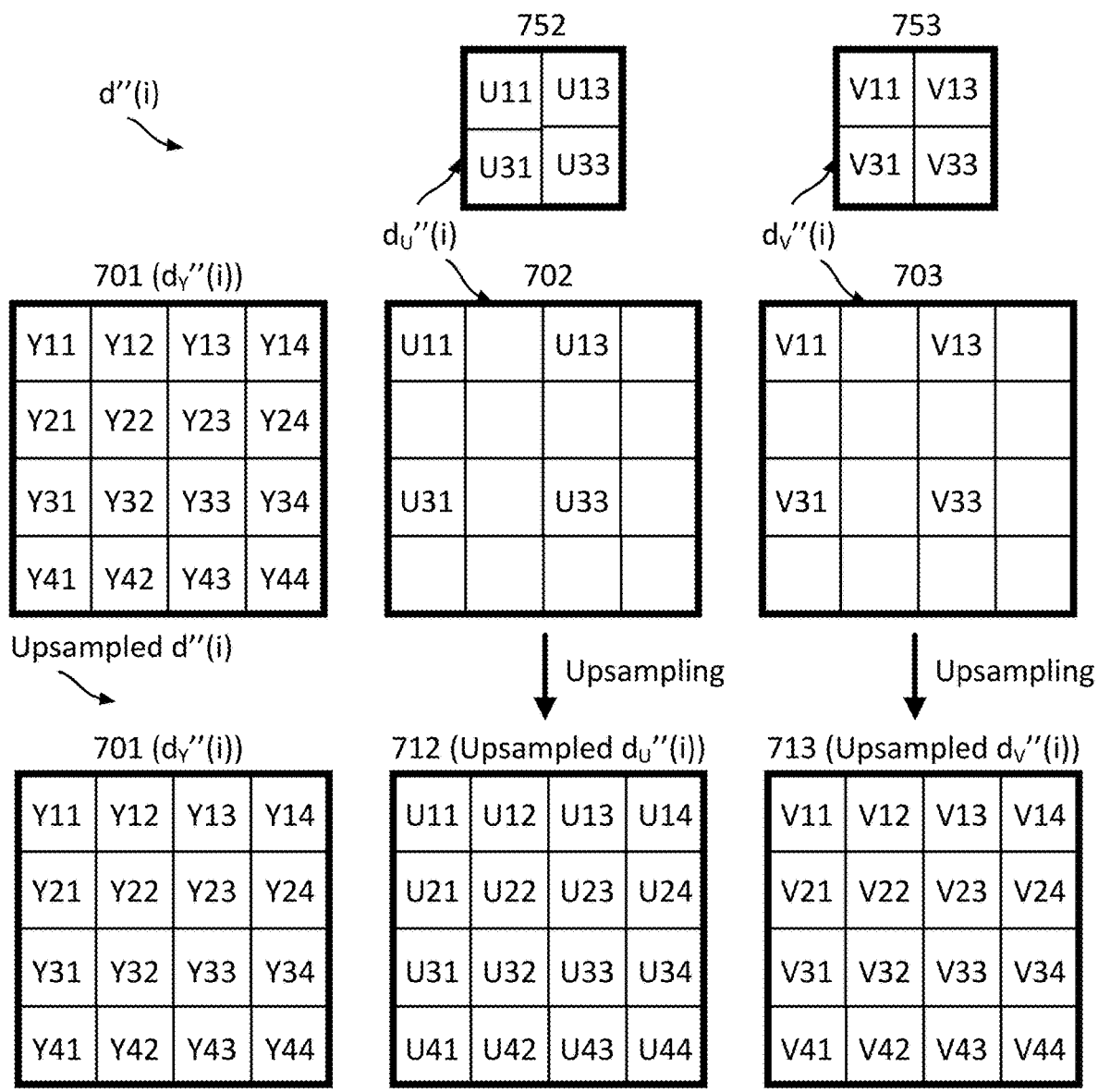
FIG. 7 show an example of upsampling a down-sampled displacement field of a chroma component to generate an up-sampled displacement field of the chroma component according to an aspect of the disclosure.

FIG. 7 show an example of upsampling a down-sampled displacement field of a chroma component to generate an up-sampled displacement field of the chroma component according to an aspect of the disclosure. Referring to FIG. 7, d"(i) includes $d_Y(i)$, $d'_U(i)$, and $d"_V(i)$. $d"_Y(i)$, $d'_U(i)$, and $d"_V(i)$ may be indicated by arrays (701) to (703), respectively. The luma array (701) has the first resolution, such as the full resolution without being down-sampled. In the example shown in FIG. 7, the luma array (701) is a 4×4 array. The chroma arrays (702)-(703) have the second resolution that is less than the first resolution. In the 4:2:0 sampling shown in FIG. 7, each of the two chroma arrays (e.g., $d'_U(i)$ and $d"_V(i)$) has half the height and half the width of the luma array (e.g., $d"_Y(i)$).

Each element or each sample at a position (i, j), such as Yij, Uij, or Vij, may represent a displacement vector associated with the position (i, j) in the respective array. The positions (i, j) in the arrays (701)-(703) may indicate the same vertex, such as a vertex in a subdivided mesh as described above. For example, Y11 in the luma array (701) represents a displacement vector of the luma component associated with the vertex indicated by (1,1), U11 in the array (702) represents a displacement vector of the chroma component U associated with the vertex indicated by (1,1), and V11 in the array (703) represents a displacement vector of the chroma component V associated with the vertex indicated by (1,1).

Referring to FIG. 7, the displacement field of the chroma component U is down-sampled using 4:2:0, information (e.g., displacement vectors) and is available at locations (or vertices) (1,1), (1,3), (3,1), and (3,3) in the arrays (702)-(703), and thus the vertices (or the locations at (1,1), (1,3), (3,1), and (3,3) in the arrays (702)-(703)) are referred to as available vertices (or available locations). Other vertices (or locations other than the available locations in the arrays (702)-(703)) may be referred to as unavailable vertices (or unavailable locations). No information is available for the unavailable vertices (or unavailable locations), such as every other location either horizontally or vertically, in the arrays (702)-(703).

Referring to the array (702), as $d'_U(i)$ is down-sampled using the sampling format 4:2:0, in the array (702), 4 displacement vectors (e.g., samples) U11, U13, U31, and U33 at the vertices (1,1), (1,3), (3,1), and (3,3) are available, information is unavailable at the other locations. For example, displacement vectors (e.g., samples) at other vertices (e.g., other locations) such as a location (1, 2) in the chroma array (702) that is between U11 and U13 are not available due to down-sampling (also referred to as subsampling). For example, information indicating the displacement vectors at the other vertices in the chroma array (702) is not transmitted from the encoder side, and thus no information is available to reconstruct the displacement vectors at the other vertices in the chroma array (702). Similarly, referring to the array (703), as $d"_V(i)$ is down-sampled using the sampling format 4:2:0, displacement vectors (e.g., samples) V11, V13, V31, and V33 are available. Displacement vectors (e.g., samples) at other locations such as V12 that is between V11 and V13 are not available due to downsampling.

In an example, at the decoder side, prior to up-sampling, the displacement vectors in the luma array (701), the displacement vectors U11, U13, U31, and U33 in the chroma array (702), and the displacement vectors V11, V13, V31, and V33 in the chroma array (703) are reconstructed. The down-sampled $d"_U(i)$ may also be indicated using a 2×2 array (752) that include only the available displacement vectors, and the down-sampled $d"_V(i)$ may also be indicated using a 2×2 array (753).

Referring to FIGS. 6B and 7, after the inverse wavelet transform, the down-sampled $d"_U(i)$ may be up-sampled, for example, according to the 4:4:4 sampling format to generate the up-sampled $d"_U(i)$ which is a chroma array (712). In an example, the upsampling of $d'_U(i)$ includes filling the unavailable vertices (or the unavailable locations) in the array (702). The filling of the unavailable vertices may be based on a zero displacement vector and/or the available displacement vectors (e.g., U11, U13, U31, and U33). For example, the upsampling of $d"_U(i)$ includes adding additional displacement vectors to the displacement vectors (e.g., U11, U13, U31, and U33) in the array (752) (e.g., a first array) to obtain the array (712) (e.g., a second array whose size is larger than the first array). The array (712) (e.g., the second array) includes the displacement vectors (e.g., U11, U13, U31, and U33) in the first array and the additional displacement vectors (e.g., 12 displacement vectors including U12, U14, and the like).

Similarly, the down-sampled $d"_V(i)$ may be up-sampled, for example, according to the 4:4:4 sampling format to generate the up-sampled $d"_V(i)$ which is a chroma array (713).

Referring to FIG. 7, the up-sampled $d"_U(i)$ (712) and the up-sampled $d"_V(i)$ (713) have the first resolution as the luma array (701). Thus, the up-sampled d"(i) includes $d"_L(i)$ (or the luma array (701)), the up-sampled $d"_U(i)$ (712), and the up-sampled $d"_V(i)$ (713).

Any suitable sampling format may be used by the encoder and the decoder. The descriptions in the disclosure may be suitably adapted to another sampling format. In the 4:2:0 format, a sampling rate is 2:1 both horizontally and vertically. In an example, a sampling rate (e.g., horizontally and/or vertically) for the chroma component(s) is 4:1. In an example of the 4:2:2 sampling, each of the two chroma arrays can have the same height and half the width of the luma array. When the sampling format is a 4:4:4 sampling, each of the two chroma arrays can have the same height and width as the luma array, and thus no down-sampling is performed at the encoder side, and no up-sampling may be needed at the decoder side. In the disclosure, the 4:2:0 format is used as an example to explain the methods, other sub-sampling formats may be applied to the displacement field coding and upsampling may be applied correspondingly.

In some examples, the wavelet coefficients or the displacement field may be coded using a sampling format (e.g., 4:2:0) for chroma component(s). At the decoder side, the decoded displacement field may be upsampled, for example, to the 4:4:4 sampling format. This disclosure includes methods and systems of upsampling of displacement coding in 3D compression such as mesh compression. The disclosed methods and systems are not limited to mesh compression.

When a non 4:4:4 format of a displacement field (e.g., including an array of displacement vectors) is decoded, no information is available for certain locations in a sub-sampled chroma component (also referred to as a chroma part) of the displacement field. Referring to FIG. 7, the displacement field of the chroma component U is down-sampled using 4:2:0, information is available at the locations (or the vertices) (1,1), (1,3), (3,1), and (3,3) in the arrays (702)-(703). No information is available for the unavailable locations. The disclosure describes examples of methods that may be used to fill the unavailable locations to generate meaningful information for the chroma component(s) of the displacement field (e.g., d"(i)).

According to an aspect of the disclosure, at the decoder side, coded information indicating that a displacement field of a chroma component of a current frame is down-sampled according to a sampling format may be received. The down-sampled displacement field of the chroma component may include a first array of displacement vectors. The first array of displacement vectors of the down-sampled displacement field may be reconstructed. The down-sampled displacement field may be up-sampled according to the sampling format to generate an up-sampled displacement field of the chroma component. The up-sampled displacement field may include a second array of displacement vectors. The second array of displacement vectors may include the first array of displacement vectors and additional displacement vectors.

FIG. 7 show an example of upsampling the down-sampled displacement field of the chroma component to generate the up-sampled displacement field of the chroma component according to an aspect of the disclosure. The current frame is indicated by the index i. The reconstructed displacement field $d''(i)$ may include $d''_Y(i)$, $d''_U(i)$, and $d''_V(i)$. $d''_U(i)$ is the reconstructed and down-sampled displacement field of the chroma component (e.g., based on the sampling format is 4:2:0). $d''_U(i)$ includes the first array (e.g., the chroma array (702) or (752)) of displacement vectors. The first array of displacement vectors includes 4 displacement vectors, e.g., the available displacement vectors U11, U13, U31, and U33.

$d''_U(i)$ may be up-sampled according to the sampling format 4:2:0, and thus additional displacement vectors are added to the first array (e.g., the chroma array (702) or (752)) of displacement vectors to generate the second array of displacement vectors, such as a chroma array (712). The second array (712) of displacement vectors can include the first array of displacement vectors (e.g., U11, U13, U31, and U33) and the additional displacement vectors, such as U12, U14, and the like.

In an aspect, the upsampling of the decoded displacement field $d'_U(i)$ may be realized by filling zeros (e.g., zero displacement vectors) in the unavailable vertices (or the unavailable sample locations) in the chroma array (702). For example, in FIG. 7, the vertex (or the location) (1, 2) may be filled with a zero vector to obtain U12 in the chroma array (712). Similarly, for $d''_V(i)$, the location (1, 2) may be filled with a zero vector to obtain V12 in a chroma array (713).

In an example, a zero displacement vector is added as one of the additional displacement vectors between two displacement vectors of the first array of displacement vectors. For example, the one of the additional displacement vectors is U12 (e.g., U12 being a zero displacement vector), and U12 is at the vertex (or the location) (1, 2) in the second array (712). U12 is between U11 and U13 that are two displacement vectors of the first array (e.g., (702) or (752)) of displacement vectors.

In an aspect, the upsampling of the decoded displacement field $d''_U(i)$ may be performed based on one or more neighboring sampling values. In an example, the upsampling is realized by copying neighboring sampling values to the unavailable sampling locations. In an example, U11 is copied to fill the vertex (or the location) (1, 2) in the first array (702) to obtain U12 in the second array (712), and thus U12 is equal to U11. Thus, one unavailable sample (e.g., at the location (1, 2)) can copy the value (e.g., U11) from a left available neighboring sample location (e.g., the location (1, 1)). Similarly, other neighboring locations (e.g., locations at (1, 3), (3, 1), and (3, 3)) can be used for such copying. In an example, a copy of one of the first array of displacement vectors (e.g., U11 is the one of the first array of displacement vectors) may be added as one of the additional displacement vectors (e.g., U12 is the one of the additional displacement vectors) that is a neighbor of the one of the first array of displacement vectors in the second array (e.g., (712)) of displacement vectors. In the second array (712), U11 and U12 are neighbors. In this example, U12 which is the one of the additional displacement vectors is a right neighbor of U11 which is the one of the first array of displacement vectors in the second array (712) of displacement vectors.

Similar operations may be applied to $d''_V(i)$ which is the chroma component V of the displacement field. For example, V11 is copied to fill the location (1, 2) in the first array (703) to obtain V12 in the chroma array (713), and thus V12 is equal to V11.

In an aspect, the upsampling of the decoded displacement field $d'_U(i)$ may be realized by a linear interpolation from the neighboring sampling values. In an example, one of the additional displacement vectors is added between a plurality of displacement vectors of the first array of displacement vectors. The one of the additional displacement vectors (e.g., U12) is a linear interpolation of the plurality of displacement vectors of the first array of displacement vectors. For example, the plurality of displacement vectors may include two displacement vectors in the same row in the first array of displacement vectors such as U11 and U13. The one of the additional displacement vectors is U12, and U12 is a linear interpolation of U11 and U13. In an example, U12=(U11+

U13)/2. In an example, a rounding operation is applied to obtain U12 from (U11+U13)/2.

In another example, the plurality of displacement vectors includes four displacement vectors (e.g., U11, U13, U31, and U33) in two adjacent rows and in two adjacent columns in the first array of displacement vectors, the one of the additional displacement vectors is U22, and U22=(U11+U13+U31+U33)/4, with an optional rounding operation.

Similar operations (e.g., the linear interpolation) may be applied to $d''_U(i)$. In an example, V12=(V11+V13)/2. In an example, V22=(V11+V13+V31+V33)/4.

Figure 8:
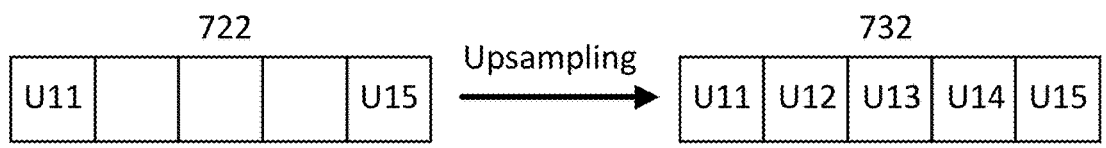
FIG. 8 shows an example of the weighted average according to an aspect of the disclosure.

In an aspect, the linear interpolation may be performed using a weighted average. FIG. 8 shows an example of the weighted average according to an aspect of the disclosure. A down-sampled displacement field of a chroma component includes a first array (722), and the down-sampled displacement field (722) is upsampled to generate a second array (732). The first array (722) includes 2 displacement vectors U11 and U15 at vertices (or locations (1,1) and (1,5) in the first array (722)). When there are more than one unavailable position between two existing positions (e.g., the locations (1, 1) and (1, 5)) along the horizontal axis or along the vertical axis, and the linear interpolation is performed, different weights may be applied to the existing positions accordingly to obtain the linear interpolation for different locations. For example, an additional displacement vector (e.g., U13) is a linear interpolation of a plurality of displacement vectors (e.g., U11 and U15) of the first array (722), and more than 1 sample (e.g., 4 samples) are between U11 and U15. A respective weight for each of the plurality of displacement vectors may be determined based on a distance between each of the plurality of displacement vectors and the one of the additional displacement vectors is added into the second array (732). For example, when the additional displacement vector is added to the location (1, 3), a distance between (1, 3) and (1, 1) is 2 samples, and a distance between (1, 3) and (1, 5) is also 2 samples, and thus the weights for U11 and U15 are identical. In an example, if U11 and U15 are available and U12, U13, U14 are to be interpolated between U11 and U15, and thus U13=(U11+U15)/2 with equal weights. When the additional displacement vector is added to the location (1, 2), a distance between (1, 2) and (1, 1) is 1 sample, and a distance between (1, 2) and (1, 5) is 3 samples, and thus the weights for U11 and U15 are 3 and 1, respectively, and U12=(3×U11+U15)/4. Similarly, U14=(U11+3×U15)/4. As described above, the linear interpolation of the plurality of displacement vectors is determined using a weighted average of the plurality of displacement vectors that is based on the weights.

In an aspect, the upsampling of the decoded displacement field $d''_U(i)$ may be realized by a non-linear interpolation from the neighboring sampling values. In an example, one of the additional displacement vectors is added between a plurality of displacement vectors of the first array of displacement vectors. The one of the additional displacement vectors is a nonlinear interpolation of the plurality of displacement vectors of the first array of displacement vectors.

Referring back to FIG. 7, the sampling format is 4:2:0, a horizontal sampling rate is 2, and a vertical sampling rate is 2. When the first array (e.g., (702) or (752)) of displacement vectors of the down-sampled displacement field $d''_U(i)$ has a size of M1×N1 (e.g., 2×2), the second array (e.g., (712)) of displacement vectors of the up-sampled displacement field has a size of 2M1×2N1 (e.g., 4×4), and the displacement field of the luma component (e.g., (701)) has a size of 2M1×2N1 (e.g., 4×4). In an example, the size of M1×N1 of the first array indicates a number of available displacement vectors in the first array.

Figure 9:
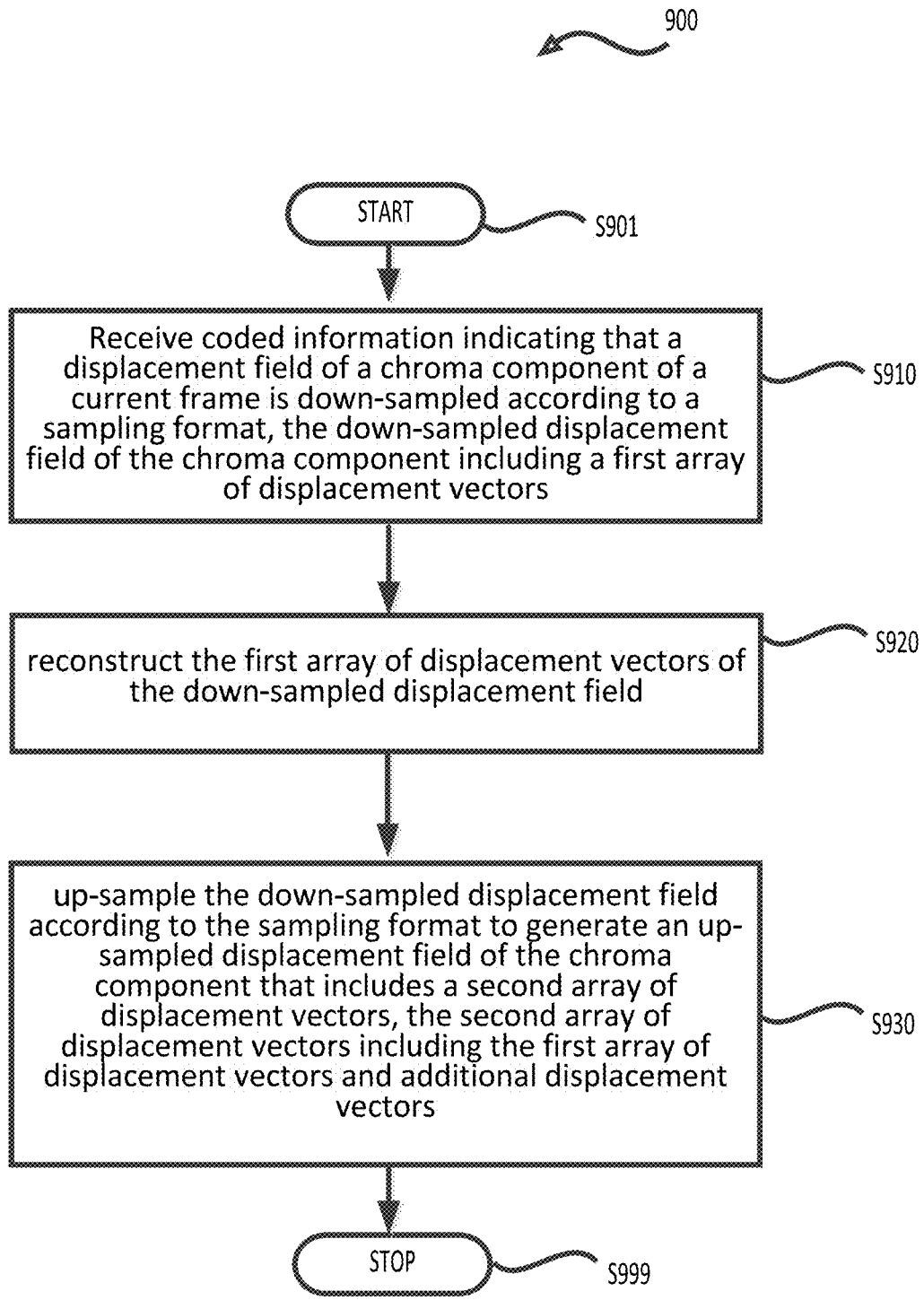
FIG. 9 shows a flow chart outlining a decoding process according to some aspects of the disclosure.

FIG. 9 shows a flow chart outlining a process (900) according to an aspect of the disclosure. The process (900) can be used in an apparatus. The apparatus may include a mesh decoder, such as a dynamic mesh decoder, and a video decoder. The video decoder is configured to, for example, decode a displacement component that is coded using a video codec. In various aspects, the process (900) is executed by processing circuitry, such as the processing circuitry that performs functions of the video decoder (110), the processing circuitry that performs functions of the video decoder (210), the mesh decoder, and/or the like. In some aspects, the process (900) is implemented in software instructions, thus when the processing circuitry executes the software instructions, the processing circuitry performs the process (900). The process starts at (S901) and proceeds to (S910).

At (S910), coded information indicating that a displacement field of a chroma component of a current frame is down-sampled according to a sampling format is received. The down-sampled displacement field of the chroma component includes a first array of displacement vectors.

At (S920), the first array of displacement vectors of the down-sampled displacement field is reconstructed.

At (S920), the down-sampled displacement field is up-sampled according to the sampling format to generate an up-sampled displacement field of the chroma component that includes a second array of displacement vectors. The second array of displacement vectors includes the first array of displacement vectors and additional displacement vectors.

In an example, a zero displacement vector is added as one of the additional displacement vectors between two displacement vectors of the first array of displacement vectors.

In an example, a copy of one of the first array of displacement vectors is added as one of the additional displacement vectors that is a neighbor of the one of the first array of displacement vectors in the second array of displacement vectors. In an example, the one of the additional displacement vectors is a right neighbor of the one of the first array of displacement vectors in the second array of displacement vectors.

In an aspect, one of the additional displacement vectors is added between a plurality of displacement vectors of the first array of displacement vectors. The one of the additional displacement vectors is a linear interpolation of the plurality of displacement vectors of the first array of displacement vectors. In an example, the plurality of displacement vectors includes two displacement vectors in the same row in the first array of displacement vectors. In an example, the plurality of displacement vectors includes four displacement vectors in two adjacent rows and in two adjacent columns in the first array of displacement vectors.

In an example, a respective weight for each of the plurality of displacement vectors is determined based on a distance between each of the plurality of displacement vectors and the one of the additional displacement vectors in the second array of displacement vectors. The linear interpolation of the plurality of displacement vectors is determined using a weighted average of the plurality of displacement vectors that is based on the weights.

In an aspect, one of the additional displacement vectors is added between a plurality of displacement vectors of the first array of displacement vectors. The one of the additional displacement vectors is a nonlinear interpolation of the plurality of displacement vectors of the first array of displacement vectors.

In an example, the sampling format is 4:2:0, a horizontal sampling rate is 2, and a vertical sampling rate is 2. When the first array of displacement vectors of the down-sampled displacement field has a size of M1×N1, the second array of displacement vectors of the up-sampled displacement field has a size of 2M1×2N1, and a displacement field of a luma component has a size of 2M1×2N1.

Then, the process proceeds to (S999) and terminates.

The process (900) can be suitably adapted. Step(s) in the process (900) can be modified and/or omitted. Additional step(s) can be added. Any suitable order of implementation can be used.

Figure 10:
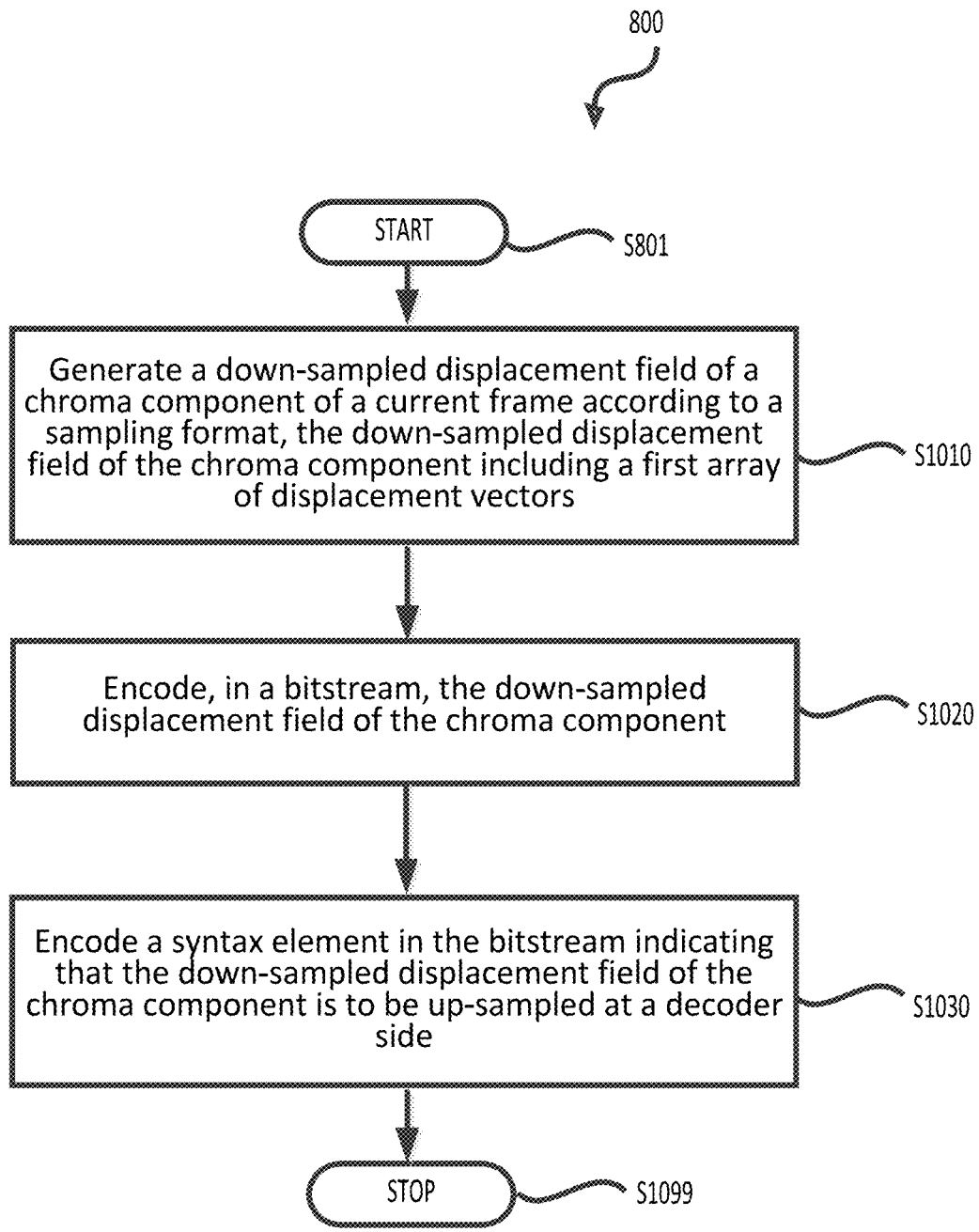
FIG. 10 shows a flow chart outlining an encoding process according to some aspects of the disclosure.

FIG. 10 shows a flow chart outlining a process (1000) according to an aspect of the disclosure. The process (1000) can be used in an apparatus. The apparatus may include a mesh encoder, such as a dynamic mesh encoder, and a video encoder. The video encoder is configured to, for example, to encode a displacement component using a video codec. In various aspects, the process (1000) is executed by processing circuitry, such as the processing circuitry that performs functions of the video encoder (103), the processing circuitry that performs functions of the video encoder (303), the mesh encoder, and/or the like. In some aspects, the process (1000) is implemented in software instructions, thus when the processing circuitry executes the software instructions, the processing circuitry performs the process (1000). The process starts at (S1001) and proceeds to (S1010).

At (S1010), a down-sampled displacement field of a chroma component of a current frame is generated according to a sampling format. The down-sampled displacement field of the chroma component includes a first array of displacement vectors.

At (S1010), the down-sampled displacement field of the chroma component is encoded in a bitstream.

At (S1010), a syntax element is encoded in the bitstream. The syntax element indicates that the down-sampled displacement field of the chroma component is to be up-sampled at a decoder side.

Then, the process proceeds to (S1099) and terminates.

The process (1000) can be suitably adapted. Step(s) in the process (1000) can be modified and/or omitted. Additional step(s) can be added. Any suitable order of implementation can be used.

In an aspect, a method of processing mesh data includes performing a conversion between a mesh data file and a bitstream of mesh data according to a format rule. For example, the bitstream is a bitstream that is decoded/encoded in any of the decoding and/or encoding methods described herein. The format rule may specify one or more constraints of the bitstream and/or one or more processes to be performed by the decoder and/or encoder.

In an aspect, the bitstream includes a syntax element indicating that an encoded displacement field of a chroma component of a current frame is down-sampled according to a sampling format. The down-sampled displacement field of the chroma component includes a first array of displacement vectors.

The format rule specifies that the first array of displacement vectors of the down-sampled displacement field is reconstructed. The format rule specifies that the down-sampled displacement field is up-sampled according to the sampling format to generate an up-sampled displacement field of the chroma component that includes a second array of displacement vectors. The second array of displacement vectors includes the first array of displacement vectors and additional displacement vectors.

In an aspect, the format rule specifies that a zero displacement vector is added as one of the additional displacement vectors between two displacement vectors of the first array of displacement vectors.

In an aspect, the format rule specifies that a copy of one of the first array of displacement vectors is added as one of the additional displacement vectors that is a neighbor of the one of the first array of displacement vectors in the second array of displacement vectors.

In an aspect, the one of the additional displacement vectors is a right neighbor of the one of the first array of displacement vectors in the second array of displacement vectors.

In an aspect, the format rule specifies that one of the additional displacement vectors is added between a plurality of displacement vectors of the first array of displacement vectors, the one of the additional displacement vectors being a linear interpolation of the plurality of displacement vectors of the first array of displacement vectors.

In an example, the plurality of displacement vectors includes two displacement vectors in the same row in the first array of displacement vectors.

In an example, the plurality of displacement vectors includes four displacement vectors in two adjacent rows and in two adjacent columns in the first array of displacement vectors.

In an aspect, the format rule specifies that a respective weight for each of the plurality of displacement vectors is determined based on a distance between each of the plurality of displacement vectors and the one of the additional displacement vectors in the second array of displacement vectors. The format rule specifies that the linear interpolation of the plurality of displacement vectors is determined using a weighted average of the plurality of displacement vectors that is based on the weights.

In an example, the format rule specifies that one of the additional displacement vectors is added between a plurality of displacement vectors of the first array of displacement vectors. The one of the additional displacement vectors is a nonlinear interpolation of the plurality of displacement vectors of the first array of displacement vectors.

The methods, aspects, and examples in the disclosure may be used separately or combined in any order. For example, some aspects and/or examples performed by the decoder may be performed by the encoder and vice versa. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
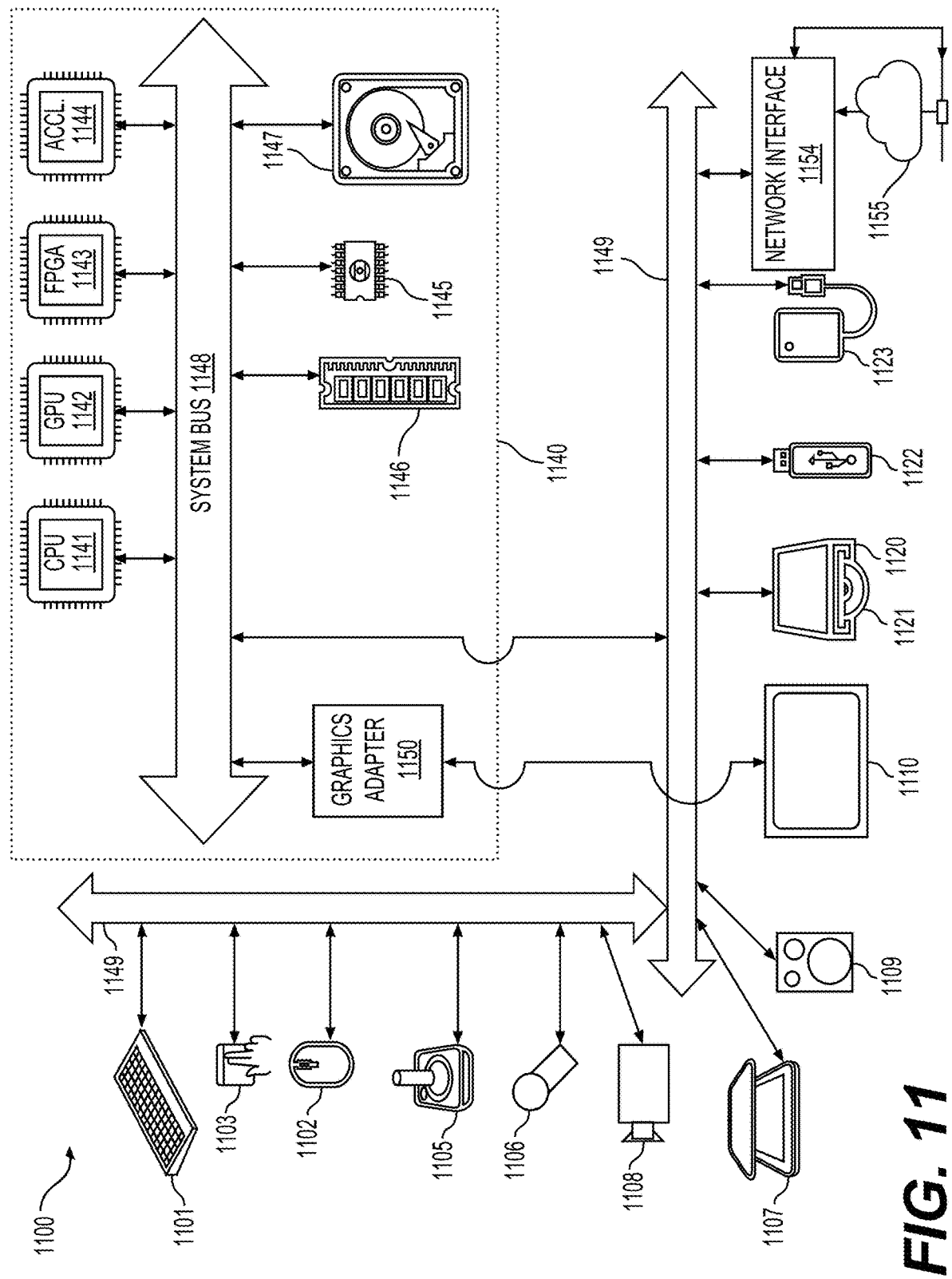
FIG. 11 is a schematic illustration of a computer system in accordance with an aspect.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for mesh decoding, the apparatus comprising:
   processing circuitry configured to:
   receive coded information indicating that a displacement field of a chroma component of a current frame is down-sampled according to a sampling format, the down-sampled displacement field of the chroma component including a first array of displacement vectors;
   reconstruct the first array of displacement vectors of the down-sampled displacement field; and
   up-sample the down-sampled displacement field according to the sampling format to generate an up-sampled displacement field of the chroma component that includes a second array of displacement vectors, the second array of displacement vectors including the first array of displacement vectors and additional displacement vectors.

2. The apparatus of claim 1, wherein the processing circuitry is configured to add a zero displacement vector as one of the additional displacement vectors between two displacement vectors of the first array of displacement vectors.

3. The apparatus of claim 1, wherein the processing circuitry is configured to add a copy of one of the first array of displacement vectors as one of the additional displacement vectors that is a neighbor of the one of the first array of displacement vectors in the second array of displacement vectors.

4. The apparatus of claim 3, wherein the one of the additional displacement vectors is a right neighbor of the one of the first array of displacement vectors in the second array of displacement vectors.

5. The apparatus of claim 1, wherein the processing circuitry is configured to add one of the additional displacement vectors between a plurality of displacement vectors of the first array of displacement vectors, the one of the additional displacement vectors being a linear interpolation of the plurality of displacement vectors of the first array of displacement vectors.

6. The apparatus of claim 5, wherein the plurality of displacement vectors includes two displacement vectors in the same row in the first array of displacement vectors.

7. The apparatus of claim 5, wherein the plurality of displacement vectors includes four displacement vectors in two adjacent rows and in two adjacent columns in the first array of displacement vectors.

8. The apparatus of claim 5, wherein the processing circuitry is configured to:
   determine a respective weight for each of the plurality of displacement vectors based on a distance between each of the plurality of displacement vectors and the one of the additional displacement vectors in the second array of displacement vectors; and
   determine the linear interpolation of the plurality of displacement vectors using a weighted average of the plurality of displacement vectors that is based on the weights.

9. The apparatus of claim 1, wherein the processing circuitry is configured to add one of the additional displacement vectors between a plurality of displacement vectors of the first array of displacement vectors, the one of the additional displacement vectors being a nonlinear interpolation of the plurality of displacement vectors of the first array of displacement vectors.

10. The apparatus of claim 1, wherein
    the sampling format is 4:2:0, a horizontal sampling rate is 2, and a vertical sampling rate is 2, and
    when the first array of displacement vectors of the down-sampled displacement field has a size of $M1 \times N1$, the second array of displacement vectors of the up-sampled displacement field has a size of $2M1 \times 2N1$, and a displacement field of a luma component has a size of $2M1 \times 2N1$.

11. A method for video encoding, comprising:
    generating a down-sampled displacement field of a chroma component of a current frame according to a sampling format, the down-sampled displacement field of the chroma component including a first array of displacement vectors;
    encoding, in a bitstream, the down-sampled displacement field of the chroma component; and
    encoding a syntax element in the bitstream indicating that the down-sampled displacement field of the chroma component is to be up-sampled at a decoder side.

12. A method of processing mesh data, the method comprising:
    processing a bitstream of the mesh data according to a format rule, wherein
    the bitstream includes a syntax element indicating that an encoded displacement field of a chroma component of a current frame is down-sampled according to a sampling format, the down-sampled displacement field of the chroma component including a first array of displacement vectors; and the format rule specifies that the first array of displacement vectors of the down-sampled displacement field is reconstructed; and the down-sampled displacement field is up-sampled according to the sampling format to generate an up-sampled displacement field of the chroma component that includes a second array of displacement vectors, the second array of displacement vectors including the first array of displacement vectors and additional displacement vectors.

13. The method of claim 12, wherein the format rule specifies that a zero displacement vector is added as one of the additional displacement vectors between two displacement vectors of the first array of displacement vectors.

14. The method of claim 12, wherein the format rule specifies that a copy of one of the first array of displacement vectors is added as one of the additional displacement vectors that is a neighbor of the one of the first array of displacement vectors in the second array of displacement vectors.

15. The method of claim 14, wherein the one of the additional displacement vectors is a right neighbor of the one of the first array of displacement vectors in the second array of displacement vectors.

16. The method of claim 12, wherein the format rule specifies that one of the additional displacement vectors is added between a plurality of displacement vectors of the first array of displacement vectors, the one of the additional displacement vectors being a linear interpolation of the plurality of displacement vectors of the first array of displacement vectors.

17. The method of claim 16, wherein the plurality of displacement vectors includes two displacement vectors in the same row in the first array of displacement vectors.

18. The method of claim 16, wherein the plurality of displacement vectors includes four displacement vectors in two adjacent rows and in two adjacent columns in the first array of displacement vectors.

19. The method of claim 16, comprising:

determining a respective weight for each of the plurality of displacement vectors based on a distance between each of the plurality of displacement vectors and the one of the additional displacement vectors in the second array of displacement vectors; and determining the linear interpolation of the plurality of displacement vectors using a weighted average of the plurality of displacement vectors that is based on the weights.

20. The method of claim 12, wherein the format rule specifies that one of the additional displacement vectors is added between a plurality of displacement vectors of the first array of displacement vectors, the one of the additional displacement vectors being a nonlinear interpolation of the plurality of displacement vectors of the first array of displacement vectors.

* * * * *